United States Patent [19]

Wang

[11] Patent Number: 5,045,595

[45] Date of Patent: * Sep. 3, 1991

[54] POLYORGANOSILOXANE/POLYVINYL-BASED GRAFT POLYMERS, PROCESS AND THERMOPLASTIC COMPOSITIONS CONTAINING THE SAME

[75] Inventor: I-Chung W. Wang, Williamstown, Mass.

[73] Assignee: General Electric Company, Parkersburg, W. Va.

[*] Notice: The portion of the term of this patent subsequent to Jul. 3, 2007 has been disclaimed.

[21] Appl. No.: 271,250

[22] Filed: Nov. 14, 1988

[51] Int. Cl.$^5$ .............................................. C08L 51/08
[52] U.S. Cl. ......................................... 525/66; 525/63; 525/67; 525/68; 525/72; 525/100; 525/104; 525/105; 525/421; 525/439; 525/440; 525/445; 525/464; 525/474; 525/479
[58] Field of Search ............... 525/479, 474, 902, 100, 525/105, 104, 63, 67, 68, 72, 66, 421, 439, 445, 440, 464

[56] References Cited

U.S. PATENT DOCUMENTS

| | | | |
|---|---|---|---|
| 2,891,920 | 6/1959 | Hyde et al. | 260/29.2 |
| 3,220,972 | 11/1965 | Lamoreaux | 260/46.5 |
| 3,775,452 | 11/1973 | Karstedt | 260/429 |
| 3,898,300 | 8/1975 | Hilliard | 260/827 |
| 4,071,577 | 1/1978 | Falender et al. | 260/827 |
| 4,226,761 | 10/1980 | Cooper et al. | 525/63 |
| 4,564,653 | 1/1986 | Kamata et al. | 525/67 |
| 4,812,515 | 3/1989 | Kress et al. | 525/69 |
| 4,939,206 | 7/1990 | Wang | 525/63 |

FOREIGN PATENT DOCUMENTS

| | | | |
|---|---|---|---|
| 0051471 | 5/1982 | European Pat. Off. | 525/66 |
| 0166900 | 1/1986 | European Pat. Off. | 283/12 |
| 0217257 | 4/1987 | European Pat. Off. | 525/479 |
| 0231776 | 8/1987 | European Pat. Off. | 525/63 |
| 0246537 | 11/1987 | European Pat. Off. | . |
| 0249964 | 12/1987 | European Pat. Off. | . |
| 0260552 | 3/1988 | European Pat. Off. | 71/04 |
| 1590549 | 6/1981 | United Kingdom | 51/08 |

OTHER PUBLICATIONS

D. Graiver et al., Rubber Chem. Tech., 56(5), 918(1983).

Primary Examiner—Melvyn I. Marquis
Assistant Examiner—Ralph Dean, Jr.
Attorney, Agent, or Firm—Hedman, Gibson, Costigan & Hoare

[57] ABSTRACT

A multi-stage polyorganosiloxane/polyvinyl-based graft polymer is provided by the co-homopolymerization of a silicone polymer and a polyvinyl polymer (e.g. polystyrene) and the subsequent graft polymerization of one or more stages of additional vinyl-type polymers. When the isolated multi-stage graft polymers are combined with thermoplastic resins and are molded, impact strength, weld line strength and thermal stability are markedly improved with no tendency to delaminate.

64 Claims, No Drawings

POLYORGANOSILOXANE/POLYVINYL-BASED GRAFT POLYMERS, PROCESS AND THERMOPLASTIC COMPOSITIONS CONTAINING THE SAME

CROSS-REFERENCE TO RELATED APPLICATIONS

This application is related to the following commonly owned, concurrently-filed U.S. patent applications, all filed on Nov. 14, 1988:

FIELD OF THE INVENTION

The invention relates to polyorganosiloxane/ polyvinyl-based graft polymers and to a process for producing such multi-stage graft polymers. Novel polyorganosiloxane/polyvinyl-based rubber products are provided comprising a polyorganosiloxane/polyvinyl first stage and one or more grafted or molecularly interlocked subsequent stages comprising a vinyl type polymer such as a styrene/acrylonitrile copolymer and/or an acrylate or (meth)acrylate polymer. Compounded thermoplastic resins containing the polyorganosiloxane/polyvinyl-based graft polymers are also provided.

They exhibit enhanced impact strength, particularly at low temperature, while maintaining particularly good thermal stability, weld line strength, and other desirable properties, without showing any tendency to delaminate.

BACKGROUND OF THE INVENTION

A novel process has been discovered for preparing a polyorganosiloxane/polyvinyl-based rubber substrate in emulsion. Subsequent graft polymerization results in a material which is extremely useful as an impact modifier for various thermoplastic resins. Many benefits can be realized from utilizing this new process over other conventional processes which do not contain the polyorganosiloxane/polyvinyl rubber substrate. For example, a highly cross-linked rubber substrate can be obtained by the present process. Improved subsequent stage grafting efficiency and lower manufacturing costs are additional benefits There have been many attempts in the art to provide polyorganosiloxane-based graft polymers which may be useful as impact strength modifiers for thermoplastic resins. See for example, U.S. Pat. No. 2,891,920 (J. F. Hyde, et al.); and O. Graiver, et al., Rubber Chem. Tech., 56 (5), 918 (1983).

The major deficiencies which have prevented the widespread use of polyorganosiloxane impact modifiers in thermoplastic resins have included raw material costs, relatively poor rubber integrity, and the incompatibility between the silicone-based rubber modifier and the thermoplastic resin. Additionally, the siloxane polymerization process requires careful control to eliminate contamination of the silicone rubber by linear or cyclic siloxane oligomers. Surface delamination in molded thermoplastic parts has been partially attributed to the presence of such oligomer contaminants in the silicone rubber.

Furthermore, polyorganosiloxane compounds generally exhibit low reactivity toward vinyl monomers during the course of subsequent graft polymerization. Several methods for improving graft efficiency have been reported. U.S. Pat. No. 3,898,300 states that a polyorganosiloxane-based graft copolymer for improving the impact strength of S/AN resin is formed by grafting S/AN comonomers in an emulsion system onto the vinylsiloxane or allylsiloxane containing silicone substrate. U.S. Pat. No. 4,071,577 describes a similar approach by using a mercaptosiloxane in place of vinyl-group containing siloxanes. European Patent Application No. 0166900 reports further improvement of polysiloxane-based graft polymers and increased S/AN impact strength by using an acryloxy-functionalized siloxane as the graftlinking agent. These graft polymers are utilized in connection with the impact modification of S/AN. British Patent No. 1,590,549 describes the use of a polyorganosiloxane graft polymer in various plastic molding compositions. Similarly, European Patent Application 0249964 describes the use of a polyorganosiloxane graft polymer in polycarbonate containing blends.

Mention is also made of European Patent Application Nos. 0246537 and 0260552, both of which describe the use as impact modifiers of a polyorganosiloxane polymer substrate on which are subsequently grafted first and second vinyl-based polymer stages. The second of said applications also describes soaking the first stage substrate with the second stage monomer(s) to cause an "entangling" thereof with the silicone prior to subsequently polymerizing the second stage.

The polyorganosiloxane-based rubber utilized in the foregoing references tends to have poor mechanical properties, poor appearance properties, a tendency to cause delamination in final molded products and generally offers poor impact strength performance in typical thermoplastic applications.

Each of these disadvantages can be overcome by improving the elastomeric properties of the rubber. This objective can be accomplished by the practice of the present invention, where polyorganosiloxane rubber substrate is replaced by a co-homopolymerized network(s) of polyorganosiloxane/polyvinyl-based polymer(s) in a co-homopolymerization process. Polyorganosiloxane/polystyrene-based co-homopolymers are particularly preferred for use in the first stage of the graft polymers of the present invention.

None of the references disclose the in-situ co-homopolymerization of vinyl monomer in the presence of siloxanes in an emulsion system, as described hereinbelow. Furthermore, the present invention is also directed to the graft polymers provided by subsequent graft polymerization of vinyl-based monomers (e.g. polymethyl (meth)acrylate, polystyrene or styrene/acrylonitrile copolymer) in the presence of the polyorganosiloxane/ polyvinyl-based polymer product of the foregoing step.

It will be seen that this multi-stage graft polymer is usefully employed as an impact strength modifier for thermoplastic molding compositions while maintaining many unique features of silicone rubber. Compounded thermoplastic resins containing the graft polymer obtained from the process disclosed herein exhibit enhanced impact strength, particularly at low temperature, while maintaining other properties, such as weathering and thermal resistance.

SUMMARY OF THE INVENTION

According to the present invention, there are provided multi-stage polyorganosiloxane/polyvinyl-based graft polymer compositions comprising: (a) as a first stage, a polymeric co-homopolymerized substrate comprised of, in combination, an organosiloxane polymer; a vinyl-based polymer; and optionally units derived from a cross-linking agent or agents, units which serve as a graft-linking agent or agents units, units derived from a cross-linking agent or agents and units from the same or different agent or agents which serve as a graft-linking agent or agents, or a mixture of any of the foregoing units; and (b) at least one subsequent stage or stage(s) graft polymerized in the presence of any previous stages and which is comprised of a vinyl-based polymer or a cross-linked vinyl-based polymer.

Also contemplated by the invention are compositions as above defined wherein said subsequent stages comprise (b)(i) a second stage comprising at least one polymer which optionally includes units derived from a cross-linking agent or agents, units which serve as a graft-linking agent or agents, units derived from a cross-linking agent or agents and units from the same or different agent or agents which serve as a graft-linking agent or agents, or a mixture of any of foregoing units; and (b)(ii) a third stage comprising at least one vinyl-based polymer or a cross-linked vinyl-based polymer which is the same as, or different than, said (b)(i) polymer.

The invention also provides a process for producing a multi-stage polyorganosiloxane/polyvinyl based graft polymer comprising the steps of:

(i) providing a first stage substrate by the concurrent co-homopolymerization of an organosiloxane and one or more vinyl-based monomer(s) optionally in the presence of effective amounts of a graft-linking agent(s), a cross-linking agent(s), a cross- and graft-linking agent(s), or a mixture thereof;

(ii) neutralizing the reaction mass of the foregoing co-homopolymerization step to a pH of at least about 6.5 to provide a neutralized polyorganosiloxane/ polyvinyl-based substrate latex;

(iii) graft polymerizing at least one vinyl-based monomer in a subsequent stage in the presence of said polyorganosiloxane/polyvinyl-based substrate thereby providing said multi-stage polyorganosiloxane/ polyvinyl-based graft polymer.

Also contemplated by the invention are compositions comprising (A) a thermoplastic resin, and an effective modifying amount of a multi-stage polyorganosiloxane/polyvinyl-based polymer composition (B) above defined. Properties modified include at least one of: impact strength, surface appearance, flame retardance and the like.

DETAILED DESCRIPTION OF THE INVENTION

The multi-stage graft polymer of the present invention is made sequentially by a process which begins with a co-homopolymerization step.

Co-homopolymerization refers to a polymerization step where two distinct polymerization mechanisms are effected concurrently, including simultaneously. In particular, the first stage co-homopolymerization may encompass a siloxane polymerization (e.g. ring opening and condensation mechanism) in conjunction with a concurrent vinyl polymerization. The discrete mechanisms are not seen as competing with each other; rather, two homopolymers are concurrently produced each retaining its own structure.

This is evidenced by the two distinct glass transition temperatures which can be detected by differential scanning calorimetry (DSC). Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft polymers of the invention.

The subsequent graft polymerization is preferably of at least one vinyl type monomer. It has been found that styrene/acrylonitrile copolymer, styrene/divinylbenzene copolymer, or an alkyl (meth) acrylate is particularly effective as the second stage graft polymer or copolymer, or as the outer most stage when intermediary stages are optionally utilized.

The foregoing polyorganosiloxane/polyvinyl-based graft polymer can be isolated and utilized as, for example, an impact strength modifying agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and the vinyl-based monomer(s) are premixed with water and suitable cross-linker(s), graft-linker(s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks under a nitrogen blanket. Heat is applied to facilitate the reaction. For typical 5 to 50 gallon stainless steel reactors, a 3 to 6 hour residence time at 75° C. to 90° C. is adequate to complete the co-homopolymerizations. Cooling for 2 to 6 hours will typically reduce the temperature to at least room temperature where the reaction mass can be held for 3 to 72 hours. Cooling to lower temperatures (e.g. 5° C.) may be sometimes preferred since this may enhance the properties of the formed polyorganosiloxane/polyvinyl substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl substrate.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl monomers in the co-homopolymerization process can be any organic soluble radical initiator, such as azobisisobutyronitrile (AIBN) and the organic peroxides, e.g. benzoyl peroxide, dichloro benzoyl peroxide, tert-butyl perbenzoate. Also suitable are water soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical, and 3000 to 9000 psi is preferred. Multiple passes through the homogenizer may be preferred, but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl substrate. This substrate is the first stage of the graft polymer of the present invention. The next stage involves the graft polymerization of additional vinyl-functional moieties onto graft sites provided by the rubbery substrate particles in the latex formed in the first stage. Subsequent additional stages are optional but may be preferred for certain applications.

The grafted polymers will preferably be the product of a vinyl polymerization process. Suitable vinyl monomers for graft polymerization include without limitation: alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl (meth)acrylate, triallyl isocyanurate, ethylene dimethacrylate, diallyl maleate, maleic anhydride; maleimide compounds such as maleimide, or N-phenyl (or alkyl)maleimide; and mixtures of these monomers.

The vinyl polymerization is accomplished in an emulsion; therefore water soluble initiators are suitable, e.g., potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized organosiloxane/ vinyl-based substrate. This substrate may have sufficient grafting sites for a second or subsequent stage to be grafted thereto. Grafted polystyrene, poly(meth)acrylate, styrene/acrolonitrile copolymer or styrene/divinylbenzene copolymer as the outermost stage is preferred, yet many other intermediary stages such as a butyl acrylate stage are also contemplated. Furthermore, the grafting of additional stages of the same or different kinds is also possible.

In general, the first stage comprising the co-homopolymerized polyorganosiloxane/polyvinyl-based substrate will comprise approximately 5 to 95 weight percent of the total graft polymer based upon the weight of the first stage substrate and the subsequent stage or stages taken together. Preferably, the first stage substrate will comprise approximately 30 to 90 weight percent on the same basis. Correspondingly, the subsequent stages, comprising the additional grafted vinyl polymer, will comprise approximately 95 to 5 weight percent and preferably approximately 70 to 10 weight percent on the same basis. In the multi-stage systems, preferably, the ratio of first stage substrate polymer (a) or (B)(a) to second stage polymer (b)(i) is 10:90 to 90:10 and the amount of third stage polymer (b)(ii) comprises from about 10 to about 90 parts by weight per 100 parts by weight of (a) or (B)(a), (b)(i), and (b)(ii) combined.

The organosiloxanes useful in the first stage co-homopolymerization are any of those known to produce silicone elastomers and may include those which are hydroxy-, vinyl-, hydride- or mercapto-end capped linear organosiloxane oligomers.

The polyorganosiloxanes illustratively will be comprised primarily of units of the formula $$R_n SiO_{(4-n)/2}$$

wherein R is hydrogen or a monovalent hydrocarbon radical of about 1 to 16 carbon atoms and n is 0, 1 or 2.

Preferred among the organosiloxanes are those in cyclic form having three or more siloxane units, and most prefered are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organoxiloxanes in the first stage are preferred to be alkenyl aromatic compounds such as styrene, divinylbenzene, alpha-methylstyrene, vinyl toluene, vinyl naphthalene, vinyl anthracene, and halogenated styrene or its derivatives. Other suitable vinyl monomers include acrylic acids and acrylates such as methyl-, ethyl-, allyl-, or butylacrylate; methacrylates such as methyl methacrylate or 2-ethylhexyl methacrylate; vinyl cyanides such as acrylonitrile or methacrylonitrile; olefins such as ethylene, propylene, butadiene, isoprene, chloroprene, and other vinyl compounds such as vinyl imidazole, 5-vinyl-2-norbornene, vinyl pyridine, vinyl pyrrolidine, vinyl acetate, vinyl alkyl ethers, vinyl chloride, vinyl furan, N-vinyl carbazole, allyl (meth) acrylate, triallyl isocyanurate, ethylene di(meth) acrylate, butylene di(meth)acrylate, diallyl maleate, maleic anhydride; maleimide compounds such as maleimide or N-phenyl (or alkyl) maleimides; acrylamides; N-(mono or di-substituted) acrylamides; and mixtures of any of these monomers. In general, any rubbery or glassy vinyl type monomer may be used which can be mixable with the organosiloxanes. Typically, the vinyl component of the first stage co-homopolymer will be present in an amount of approximately 3 to 97 weight percent, and correspondingly, the organosiloxane component will be present in an amount of approximately 97 to 3 weight percent. Preferably, the vinyl-based component will comprise approximately 5 to 45 weight percent of the first stage of the co-homopolymerized substrate.

Platinum compounds are often utilized in conjunction with polyorganosiloxane compositions in order to enhance the flame retardance of the latter. Platinum complexes are also used as catalysts in certain hydrosilation processes although such catalysts are not necessary for the practice of the present invention. As flame retarding additives, however, there may optionally be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The cross-linker composition used in conjunction with the organosiloxane component of the present compositions can have the general formula $$R^2{}_n-Si(OR^1)_{4-n}$$

wherein n is 0, 1 or 2, preferably 0 or 1 and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, thio, or acryloxyalkyl radical and n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at elevated temperature for about 10 minutes whereupon it may be filter washed. Commercial latex isolation techniques such as spray dryers may also be utilized.

In a preferred feature of the invention, the isolated multi-stage graft polymer may be utilized as an impact modifier in a composition comprising a thermoplastic resin (A) and the modifier (B). Illustrative of the thermoplastic resins are a poly(vinylic) resin, a polyester resin, a polyamide resin, a polycarbonate resin, a polyacetal resin, a polyether resin, a poly(etherester) resin, a poly(etherimide) resin, a poly(etherimide ester) resin, a poly(sulfone) resin, a poly(ethersulfone) resin, interpolymers comprising units of any of the foregoing resins, and compositions comprising blends of any of them.

Examples of suitable poly(vinylic) resins include styrene polymers and copolymers as well as substituted styrene polymers and copolymers, e.g., those from vinyl toluene and alpha-methylstyrene and any copolymerizable vinyl monomer, such as acrylonitrile, methyl methacrylate, maleimide, or maleic anhydride, as well as grafts of styrene and related compounds and backbone polymers such as butadiene, i.e., the styrene polymers known as high impact polystyrene, also known as, HIPS. Polyesters suitable for use in component (A) are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

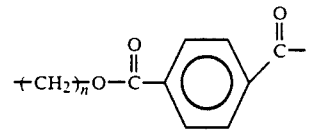

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

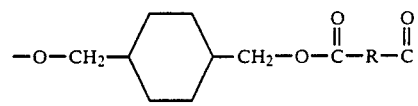

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenol) ethane, 4,4'-dicarboxydiphenyl ether, etc., and mixtures of these. All of these acids contain at least one aromatic nucleus. Acids containing fused rings can also be present, such as in 1,4- or 1,5-naphthal nedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

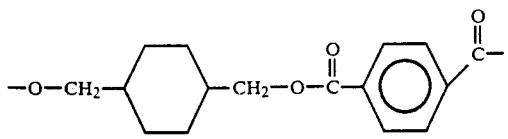

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

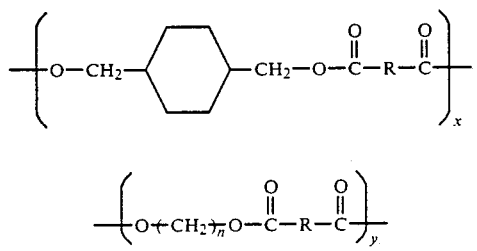

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

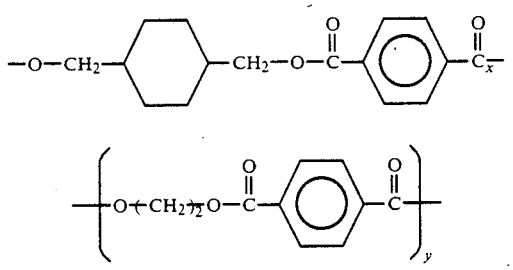

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°–30° C.

Examples of suitable nylons are linear polycondensates of lactams of 6 to 12 carbon atoms and conventional polycondensates of diamines and dicarboxylic acids, e.g. nylon 6,6; nylon 6,8; nylon 6,9; nylon 6,10; nylon 6,12; nylon 8,8 and nylon 12,12. Further examples to be mentioned are nylon 6, nylon 11 and nylon 12, which are manufactured from the corresponding lactams. In addition, it is possible to use polycondensates of aromatic dicarboxylic acids, e.g., isophthalic acid or terephthalic acid, with diamines, e.g., hexamethylenediamine or octamethylenediamine, polycondensates of aliphatic starting materials, e.g., m- and p-xylylenediamines, with adipic acid, suberic acid and sebacic acid, and polycondensates based on alicyclic starting materials, e.g. cyclohexanedicarboxylic acid, cyclohexanediacetic acid, 4,4'-diaminodicyclohexylmethane and 4,4'-diaminodicyclohexylpropane. The nylons preferably have a relative viscosity of from 2.30 to 3.60 measured at 1 percent strength in concentrated sulfuric acid at 24° C.

The preferred polycarbonate to use as component (A) in the molding compositions according to the invention is poly-2,2-propane-bis(4-phenyl)carbonate, which is manufactured in accordance with conventional processes by reacting phosgene or diphenylcarbonate with 2,2-(diphenyl-4'-dihydroxy)-propane. Other preferred polycarbonates contain tetrabromobisphenol-A as an additional comonomer, which improves the fire resistance of the molding compositions.

Examples of polyacetals which may be employed as component (A) are, in particular, the oxymethylene polymers, polyoxymethylene being of particular importance. However, oxymethylene copolymers which, in addition to oxymethylene groups, contain up to 30 percent by weight, preferably from 0.1 to 25 percent by weight, of other oxyalkylene groups, for example the oxyethylene group, the trimethylene oxide group, or preferably, the tetramethylene oxide group, are also suitable, as are terpolymers. The use of oxymethylene homopolymers in which the end groups of the molecules have been stabilized against degradation by esterifying, etherifying or some other conventional chain termination is preferred. The oxymethylene polymers usually have a melting point of about 130° C.

Polyethers which can be used as component (A) are, in the main, polyarylene ethers amongst which polyphenylene ethers deserve particular mention. The use of poly(2,6-dimethyl-1,4-phenylene oxide) is preferred, and in order to lower its melt viscosity and improve its processability, it may be advantageous to admix it with from about 10 to 90 percent by weight of polystyrene (based on the mixture of polyphenylene ether and polystyrene). If polyphenylene ethers are to be blended, e.g., with polyamides, polycarbonates, polyesters, mixtures thereof, and the like, a small amount of functionalizing agent, e.g., maleic anhydride, fumaric acid, etc., can be reacted with the polyphenylene ether in known ways to improve compatibility.

The amounts of components (A) and (B) can vary broadly, but will usually be in the range of from about 1 to about 99 parts by weight of (A) to from about 99 to about 1 part by weight of (B), per 100 parts by weight of (A) and (B) together. Preferably (A) comprises from about 99 to about 37 parts by weight and (B) comprises from about 1 to about 63 parts by weight.

The compositions can also be further rendered more flame retardant with effective amounts, e.g., between about 1 and 30 parts by weight per 100 parts by weight of resin, of a flame retardant agent as component (C), e.g., elementary red phosphorous, phosphorous compounds, halogen compounds, nitrogen compounds, antimony oxide, zinc oxide, metal salt(s) of sulfonated diphenylsulfone, metal salt(s) of trichlorobenzenesulfonic acid, mixtures thereof and the like.

In addition, reinforcing fillers; dyes and colored pigments; heat stabilizers; thermooxidative stabilizers and UV stabilizers; waxes, lubricants and processing assistants, which ensure trouble-free extrusion and injection molding; and antistatic agents may be added to the molding compositions according to the invention.

Conventional processes for mixing thermoplastic polymers can be used for the manufacture of molding compositions within the invention. For example, the compositions can be manufactured by using any suitable mixing equipment, e.g., cokneaders or extruders. The mixing temperatures are in general from 150° to 370° C., preferably from 200° to 345° C. The polymers are fused and thoroughly mixed, with or without the other additives described.

The addition of the graft polymers, described above does not adversely influence the processing stability of the thermoplastically processable plastics material. The processing of the new molding compositions by extrusion or injection molding is preferably carried out at from 200° to 345° C., with the mold, in the latter case, being at from 50° to 150° C.

DESCRIPTION OF THE PREFERRED EMBODIMENTS

The following examples illustrate the invention without limitation. All parts given are by weight unless otherwise indicated. Impact strengths are reported as notched Izod (NI) according to ASTM D-256 at 23° C. unless otherwise specified and Charpy NI in the falling weight test to define ductile/brittle transition temperature. Weld line strength is measured on unnotched ⅛′ Izod bars molded in a double-gated mold.

EXAMPLES

The following abbreviations are used in accordance with the following tables in the following examples:
Si = general term for organosiloxanes include D4, VMD4, VTMOS, TEOS, APTMOS, etc.
D4 = octamethylcyclotetrasiloxane
VMD4 = tetramethyltetravinylcyclotetrasiloxane
VTMOS = vinyltrimethoxysilane
TEOS = tetraethoxysilane
APTMOS = gamma-methacryloxypropyltrimethoxysilane
S = styrene
DBS = dibromostyrene
AN = acrylonitrile
BA = n-butyl acrylate
MMA = methyl methacrylate
DAM = diallyl maleate
MA = methyl acrylate
EA = ethyl acrylate
NPM = n-phenyl maleimide
PMS = p-methyl styrene
DVB = divinylbenzene
BDA = 1,3-butylene diacrylate A single slash is used between monomers of a single stage and a double slash or a hyphen is used as a shorthand method of indicating separation between stages. The first stage to be polymerized is written first before the double slash or hyphen, and subsequent stages are written subsequently.

EXAMPLE 1

Octamethylcyclotetrasiloxane 90 parts, tetramethyltetravinylcyclotetrasiloxane 10 parts, tetraethoxysilane 1.7 parts, gamma-methacryloxypropyltrimethoxysilane 1.43 parts, and 0.097 part of a platinum complex with chloroplatinic acid and containing 35,000 ppm platinum prepared in accordance with U.S. Pat. No. 3,220,972, were mixed together. A mixture of styrene 33.3 parts and divinylbenzene 0.67 part was thereafter added. The organic mixture was then added to deionized water, 400 parts containing 1.33 parts dissolved dodecylbenzenesulfonic acid. The final mixture was stirred and then emulsified by passing twice through a homogenizer at a pressure ranging from 4600 to 8400 psi.

The emulsion was placed in a flask equipped with a condenser and nitrogen inlet port and was stirred. The emulsion was heated to 75° C. while under nitrogen sparge. After reaching a temperature of 75° C., the nitrogen purging was terminated, and potassium persulfate 0.167 part dissolved as a 2 weight percent solution in water was added. The polymerization continued at 75° C. for 6 hours. The reaction mass was then cooled down to room temperature. The yield of the co-homopolymer was 82.3%, the degree of polymer swelling was 13.4, the gel content was 62.4%, and the volume average mean diameter of the particles was 190 nanometers as measured by a laser light scattering method. Glass transition temperatures (Tg's) of −123° C. and 105° C., T(cryst) of =85° C., and melt temperature of =57° C. were characterized by differential scanning calorimeter.

This polyorganosiloxane/polystyrene co-homopolymer latex was neutralized with aqueous $K_2CO_3$ to pH 8.3, and a major portion of the neutralized latex was filtered through a nylon cloth into a flask equipped with a dropping funnel, condenser, nitrogen inlet port, and stirrer. The neutralized latex was heated to 75° C., and potassium persulfate, 0.24 part in water, was added. The second stage polymerization was begun after fifteen minutes when a mixture of styrene 35.7 parts and acrylonitrile 11.9 parts was added dropwise over 2.5 hours. Thirty parts of the styrene and acrylonitrile to be graft polymerized were utilized per 70 parts of dry silicone/ polystyrene rubber substrate from the first stage. After completion of the addition, the polymerization was continued for 3.0 hours and was essentially completed. The graft polymer comprised of both stages was isolated in a hot aqueous solution of $MgSO_4$ and was washed and dried at 75° C. until a constant weight was obtained. The graft efficiency was 57.0% as measured by MEK Soxhlet extraction.

EXAMPLES 2-5

The multi-stage graft polymer of Example 1 was isolated in powder form and was melt blended at concentrations from 2 to 5 weight percent with poly(bisphenol-A carbonate) molding resin in the following manner: A dry blend of polycarbonate resin, co-homopolymerized polyorganosiloxane/polyvinyl-based multi-stage modifier (CSiM) or comparative modifiers and other ingredients was tumble mixed in a jar shaker to give a homogenous dispersion. Each polycarbonate blend additionally contained 0.3 part potassium salt of monosulfonated diphenylsulfone flame retardant. The well mixed dry blend was then extruded on a Werner & Pfleiderer 30 mm twin screw extruder under typical conditions for polycarbonate resin. The extrudate was pelletized, dried and injection molded into test specimens on a 75-ton Newbury molding machine.

COMPARATIVE EXAMPLE 5A*

Poly(bisphenol-A carbonate) molding resin was extruded by the method of Examples 2-5.

COMPARATIVE EXAMPLE 5B*

A dry blend of polycarbonate resin, 95 parts, and graft polyorganosiloxane impact modifier without polystyrene in the substrate (GSiM) prepared according to Mitsubishi, EPO 166,900, 5 parts, and other ingredients was prepared, extruded, pelletized and molded by the method of Examples 2-5.

The resulting injection molded parts of Examples 2-5 all exhibited good surface appearance without delamination or marbled skin. Table 1 summarizes the mechanical properties of the blends.

TABLE 1

| Example | 2 | 3 | 4 | 5 | 5A* | 5B* |
|---|---|---|---|---|---|---|
| Composition (parts by weight) | | | | | | |
| resin$^a$ | 98 | 97 | 96 | 95 | 100 | 95 |
| CSiM$^b$ | 2 | 3 | 4 | 5 | — | — |
| GSiM$^c$ | — | — | — | — | — | 5 |
| Properties | | | | | | |
| Weld Line Double Gate Strength, ⅛", unnotched (ft-lb/in) | NB | 34 | 34 | 34 | 37.3 | 26 |
| NI @ r.t. (ft-lb/in) .250" | 5.5 | 11.7 | 12.4 | 12.3 | 2.0 | 11.6 |
| Charpy NI .125" @ r.t. (ft-lb/in) | 15.7 | 14.5 | 12.1 | 11.7 | — | — |
| 5° C. | — | — | — | — | 13.7 | — |
| 0 | 14.8 | — | — | — | 9.4 | — |
| −10 | 7.5 | — | — | — | 1.6 | — |
| −20 | 4.3 | 9.9 | 10.6 | 10.0 | 2.1 | — |
| −30 | 3.2 | 4.5 | 5.5 | 7.1 | 1.6 | — |
| −40 | 1.8 | 3.6 | 5.3 | 4.4 | — | — |
| −50 | 0 | 2.6 | 2.6 | 4.3 | — | — |
| D/B(°C.)$^d$ | −10 | −20 | −22 | −30 | −5 | — |

*Comparative Example
$^a$Lexan ® 141 poly(bisphenol-A carbonate) General Electric Company
$^b$CSiM co-homopolymerized polyorganosiloxane/polyvinyl-based multi-stage modifier, Example 1.
$^c$GSiM graft polyorganosiloxane impact modifier without polystyrene in the substrate according to Mitsubishi EPO 166,900
$^d$ductile/brittle transition temperature, degrees C.

In comparison with the control 5A* the blends using the CSiM modifier of this invention, 2-5, showed marked improvements in quarter inch notched Izod impact strength. One-eighth inch Charpy notched impact resistance and good low temperature ductility were also obtained without sacrificing weld line strength of the polycarbonate. However, if a silicone graft polymer without the polystyrene network in the substrate according to the prior art is used (control 5B*), the double gate strength is lowered significantly.

EXAMPLE 6

A polyorganosiloxane/polystyrene rubber latex was prepared in accordance with the procedure of Example 1 but differed in that $K_2S_2O_8$ solution was added in five equally divided portions, each at one hour intervals during the first four hours. The final yield of the silicone/polystyrene rubber of the first stage was 86%, the degree of swelling was 11.7, and the gel content was 67%.

EXAMPLE 7

The multi-stage graft polymer of Example 6 was blended in General Electric Lexan® 141 aromatic polycarbonate at 5 percent loading. The molded articles with good surface appearance had a quarter inch notched Izod impact strength of 12.1 ft-lbs/in; and eighth-inch Charpy notched impact strength of 16.2, 11.5, 12.1, 8.1 and 6.8 ft-lbs/in. at 23° C., −20° C., −30° C., −40° C. and −50° C., respectively.

EXAMPLE 8

A polyorganosiloxane/polystyrene rubber latex was prepared in accordance with the procedure of Example 1 but differed in that 5 parts of tetramethyltetravinylcyclotetrasiloxane was replaced by 5.5 parts of vinyltriethoxysilane, and $K_2S_2O_8$ was added in five equally divided portions, each at one hour intervals over four hours. The final yield of the silicone/polystyrene rubber first stage was 82%, the degree of swelling was 10.5, and the gel content was 72.8%. Styrene and acrylonitrile were graft polymerized in the same manner as in Example 1. The graft efficiency was 74.2%.

EXAMPLES 9-11

The multi-stage graft polymer material of Example 8 was blended in Lexan® 141 polycarbonate at 5, 7.5, and 10 percent loadings. The respective weld line strengths of the molded polycarbonate blends were 28.5, 25.1 and 21.3 ft-lbs/in; quarter inch notched Izod impact strengths were 15.9, 13.9, and 13.2 ft-lbs/in; and eighth inch Charpy notched impact strength at −50° C. were 11.6, 10.8, and 9.5 ft-lbs/in. None of the molded articles showed surface delamination under normal polycarbonate injection molding conditions.

COMPARATIVE EXAMPLE 11A*

The composition and procedures of Example 8 were used to make a silicone-based graft polymer which differed in that only the styrene monomer was omitted at the beginning of the homogenization stage. The resulting polyorganosiloxane had a 67% gel content, and the degree of swelling was 10.4. The styrene/ acrylonitrile graft efficiency onto the rubber substrate was only 22%.

COMPARATIVE EXAMPLE 11B*

The silicone emulsion and styrene/acrylonitrile graft polymerization product was prepared in accordance with the procedure of Comparative Example 11A* except that the $K_2S_2O_8$ was not used in the first stage emulsion step. The resulting silicon rubber had a 71% gel content, and the degree of swelling was 14.6. The S/AN graft efficiency was only 25%.

COMPARATIVE EXAMPLES 11C*-11F*

A series of polyorganosiloxane rubber latices were prepared by a homogenization and emulsion procedure similar to that of Example 1 except that the polymerization was carried out at 90° C., the source of siloxane was 100 parts octamethylcyclotetrasiloxane. Styrene monomer, divinylbenzene, and persulfate initiator were omitted. Various amounts of organosiloxane cross-linkers and graft-linkers were utilized as indicated in Table 2. The subsequent styrene/acrylonitrile graft polymerization was also as described in Example 1, again at 30 parts styrene/acrylonitrile per 70 parts by weight silicone rubber substrate. The rubber characterization and graft efficiency are listed in Table 2. In all cases, graft efficiency and rubber integrity were poor. Each of the thus obtained graft polymers was compounded at a 10 weight percent concentration in Lexan® 141 polycarbonate resin. Severe surface delamination was observed in all blends. It was necessary to carefully adjust the injection pressure or shot speed to reduce, but not to eliminate, the appearance of a marbled surface. It is seen that the impact strength of the modified blends could only be moderately improved over straight polycarbonate.

TABLE 2

| Comparative Example[a] Composition | 11C* | 11D* (wt in parts) | 11E* | 11F* |
|---|---|---|---|---|
| Octamethylcyclotetrasiloxane | 100 | 100 | 100 | 100 |
| Tetraethoxysilane | 1.0 | 2.0 | 2.0 | 1.7 |
| Methacryloxypropylmethyldiethoxysilane | .75 | .75 | 1.5 | — |
| Methacryloxypropyltrimethoxysilane | — | — | — | 1.43 |
| Dodecylbenzenesulfonic acid | 1.0 | 1.0 | 1.0 | 1.0 |
| Deionized water | 300 | 300 | 300 | 300 |
| Silicone Rubber Characterization | | | | |
| Degree of Swelling | 18.0 | 21.6 | 22.2 | 21.1 |
| Gel Content % | 74 | 65 | 64 | 60 |
| S/AN (30 parts per hundred parts resin) Emulsion Graft Polymerization Graft Efficiency % | 34.2 | 0 | 2.2 | 28 |
| 10% BLEND IN POLYCARBONATE | | | | |
| Marbled Surface | yes | yes | yes | yes |
| Notched Izod @ r.t. .250" | 4.5 | 3.7 | 9.4 | 9.5 |

[a]Siloxane emulsion polymerization at 90° C. for 6 hours.

EXAMPLES 12-14

The same composition and polymerization procedure utilized for Comparative Example 11F* in Table 2 were used to prepare a silicone/polystyrene-based rubber latex with the exception that styrene and divinylbenzene were co-homopolymerized by azobisisobutyronitrile (AIBN) catalyst in the substrate rubber. The initial ingredients were as indicated by Example 12 in Table 3. Examples 13 and 14 were prepared in similar fashion except that 10 parts of octamethylcyclotetrasiloxane were replaced with tetramethyltetravinylcyclotetrasiloxane.

In contrast to Comparative Examples 11C* to 11F* which did not include polystyrene in the substrate, all of the polyorganosiloxane/polystyrene-based rubber products, according to this invention, possess a higher cross-linking efficiency as indicated by lower degree of swelling.

TABLE 3

| Example | 12 | 13 | 14 |
|---|---|---|---|
| Composition (parts by weight) | | | |
| Octamethylcyclotetrasiloxane | 100 | 90 | 90 |
| Tetramethyltetravinylcyclotetrasiloxane | — | 10 | 10 |
| Tetraethoxysilane | 1.7 | 1.7 | 1.7 |
| Methacryloxypropyltrimethoxysilane | 1.43 | 1.43 | 1.43 |
| Platinum Complex[a] | — | — | 0.098 |
| Styrene | 33 | 33 | 33 |
| Divinylbenzene | .67 | .67 | .67 |
| AIBN | .25 | .25 | .25 |
| Dodecylbenzenesulfonic acid | 1.33 | 1.33 | 1.33 |
| Deionized water | 400 | 400 | 400 |
| Silicone/Polystyrene Rubber Characterization | | | |
| Degree of Swelling | 14.3 | 9.5 | 9.6 |
| Gel Content % | 53 | 48 | 67 |

[a]Platinum Complex as used in Example 1.

EXAMPLE 15

This example illustrates the preparation of multi-stage compositions by using a multi-staged reaction:

(i). Silicone/Polystyrene Co-homopolymerized First Stage Latex

To a siloxane premixture which contains 90 parts of octamethylcyclotetrasiloxane, 10 parts of tetramethyltetravinylcyclotetrasiloxane, 1.7 parts of tetraethoxysilane, and 1.43 parts of gammamethacryloxypropyltrimethoxysilane was added a vinyl monomeric premixture containing 33.3 parts of styrene, 0.67 part of divinylbenzene and 0.25 part of azobisisobutyronitrile (AIBN). Then the whole organic mixture was stirred into 400 parts of deionized water in which 1.33 parts of dodecylbenzenesulfonic acid was dissolved. The agitated final mixture was then pre-emulsified by passing twice through a homogenizer at a pressure of 4600-8400 psi. The organosiloxanes/styrenics pre-emulsion thus prepared was subjected to a co-homopolymerization under a nitrogen blanket. The solids content after 4.5 hour reaction at 90° C. and then quenching by the addition of aqueous $K_2CO_3$ solution to a pH of 7.4 was 21.6%, and the yield was 87%. The first stage rubber particle size was 246 nanometers, volume averaged; and the rubber had a gel content of 48% and a degree of swelling of 9.5.

(ii). 1st Subsequent Stage Grafting of Cross-linked Acrylate Rubber

To 162 parts latex of stage (i), two streams of mixtures were concurrently added over a one hour period at 75° C. The first stream contained 35 parts of butyl acrylate, 0.175 part of 1,3-butylene glycol diacrylate, 0.14 part of diallyl maleate, and sodium dodecylbenzene sulfonate, 0.875 part dissolved in 20.5 parts of deionized water; and the second stream consisted of 3.5 parts of 1% potassium persulfate aqueous solution. After the completion of the addition, the emulsion was held for one more hour at 75° C. The solids content of the latex at the end of this stage was 32% with a volume averaged particle size of 266 nanometers. The rubber isolated for characterization had a 94.5% gel content and a degree of swelling of 8.9.

(iii). 2nd Subsequent Stage Grafting of SAN 0.15 part of potassium persulfate in 7.5 parts of deionized water was mixed in the latex of stage (ii) and held for 15 minutes at 75° C. before 30 parts of a styrene/acrylonitrile (S/AN wt. ratio of 75:25) mixture was continuously added over a period of 1.5 hours and held at that temperature for 3 additional hours. The final solids content was 39%. The powder form material isolated from stage (iii) latex, which had a S/AN graft efficiency of 80%, was then blended with polycarbonate or PBT as described in the following examples.

EXAMPLE 16 AND COMPARATIVE EXAMPLES 16A*

10 parts (Si/PS)-BA-SAN (CSiM) of Example 15 was melt blended with 90 parts of polycarbonate (Lexan ® 141) in an extruder and later injection molded into shaped articles for various properties' evaluation (Example 16). For comparison purposes a GSiM copolymer modifier without styrene in the first stage substrate is prepared by following Example 15, but omitting the styrene, DVB and AIBN in stage (i). Ten parts of this is blended with 90 parts of polycarbonate, molded and tested (Example 16A*). The properties are summarized in Table 4.

TABLE 4

| IMPACT STRENGTH AND THERMAL STABILITY | | | |
|---|---|---|---|
| Example | | 16 | 16A* |
| .125" NI (ft-lbs/in) | | 14.3 | 12.8 |
| .250" NI (ft-lbs/in) | | 11.1 | 10.1 |
| .125" Charpy NI | | | |
| −30° C. | | 9.1 | — |
| −40° C. | | 6.9 | — |
| −50° C. | | 4.8 | — |
| Gardner Impact | | | |
| Peak Load | (as is) | 1027 | 953 |

TABLE 4-continued

| IMPACT STRENGTH AND THERMAL STABILITY | | | |
|---|---|---|---|
| Example | | 16 | 16A* |
| (lbs) | (aged)* | 1007 | 931 |
| Energy Absorbed @ Peak | (as is) | 32 | 28.7 |
| (ft-lbs) | (aged)* | 28 | 32.4 |
| Yellowness Index | | | |
| | (as is) | 13.5 | 16.0 |
| | (aged)* | 15.7 | 20.3 |

*After thermal aging at 125° C. for 4 days.

Surface mottling was a serious drawback with Comparative Example 16A* but was not observed with Example 16. As can be seen, Example 16 has better impact resistance and ability to resist thermal aging than does the control, Comparative Example 16A*.

EXAMPLES 17 AND 18

20 parts of the (Si/PS)-BA-SAN (CSiM) of Example 15 was melt blended in 80 parts of poly(1,4-butylene terephthalate) (PBT) (Valox ® 315 General Electric Company) (Example 17). The molded article had a notched Izod impact strength (NI) of 2.6 ft-lbs/in., a tensile strength of 5230 psi and elongation at break of 28%. In the presence of 1 part of red pigment, good color dispersion with a desirable dull surface appearance was observed, and the notched Izod impact strength was 2.1 (Example 18).

EXAMPLE 19 AND COMPARATIVE EXAMPLE 19A*

A (Si/PS)-BA-SAN (CSiM) with a wt. ratio of 35:35:30 was prepared by the same procedures as described as in Example 15. 5 parts of the material was melt blended with 95 parts of a polycarbonate (Lexan ® 141) (Example 19). For comparison purposes a GSiM copolymer modifier without polystyrene, DVB and AIBN in the first stage substrate is prepared by following the procedure of Example 15 and 5 parts are blended with 95 parts of polycarbonate, molded and tested (Comparative Example 19A*). The injection molded articles of Example 19 had a 0.125" NI of 15.2 ft-lbs/in, a 0.250" NI of 14.3 ft-lbs/in, and a weld line strength of 37.5 ft-lbs/in. In Comparative Example 19A*, the weld line strength was drastically reduced to 20.9 ft-lbs/in.

EXAMPLES 20 to 36

Using the co-homopolymerization process of organosiloxane/vinyl monomers in emulsion polymerization of the present invention, multi-stage silicone/vinyl polymer-based graft polymers according to the following compositions are prepared as listed in Table 5:

TABLE 5

| | CSiM | |
|---|---|---|
| Example | Composition | Monomer Weight Ratio |
| 20 | D4/VMD4/TEOS/APTMOS/BA/BDA/DAM//S/AN | 23.8/2.6/0.4/0.38/26.5/0.26/0.13//34.4/11.5 |
| 21 | D4/VMD4/TEOS/APTMOS/S/DVB//DBS/S/AN | 49.2/0.55/0.93/0.78/18.2/0.36//11.2/11.3/7.5 |
| 22 | D4/VMD4/TEOS/APTMOS/S/DVB//S/AN | 65.9/1.5/7.48/1.06/4/0.08//15/5 |
| 23 | D4/VMD4/TEOS/APTMOS/S/DVB//MMA | 65.9/1.5/7.48/1.06/4/0.08//20 |
| 24 | D4/VMD4/TEOS/APTMOS/S/DVB//MMA/EA | 65.9/1.5/7.48/1.06/4/0.08//18/2 |
| 25 | D4/VMD4/TEOS/APTMOS/S/DVB//MMA/NPM | 65.9/1.5/7.48/1.06/4/0.08//18/2 |
| 26 | D4/VMD4/TEOS/APTMOS/S/DVB//S/AN/MMA | 65.9/1.5/7.48/1.06/4/0.08//13.5/4.5/2 |
| 27 | D4/VMD4/TEOS/APTMOS/S/DVB//S/AN/DVB | 57.6/1.3/6.5/0.9/3.5/0.07//22.5/7.5/0.3 |
| 28 | D4/VMD4/TEOS/APTMOS/S/DVB//S/AN/DVB | 42.0/4.7/5.2/0.73/17/0.34//22.5/7.5/0.3 |
| 29 | D4/VMD4/TEOS/APTMOS/S/DVB//S/AN/DVB | 30.8/3.4/3.8/0.54/30.9/0.62//22.5/7.5/0.3 |
| 30 | D4/VMD4/TEOS/APTMOS/S/DVB//PMS/DVB | 52.7/5.9/6.5/1.5/3.2/0.07//29.4/0.6 |
| 31 | D4/VMD4/TEOS/APTMOS/S/DVB//PMS/AN | 52.7/5.9/6.5/1.5/3.2/0.07//22.5/7.5 |
| 32 | D4/VMD4/TEOS/APTMOS/S/DVB//MMA/MA/BDA | 52.7/5.9/6.5/1.5/3.2/0.07//22.5/6/1.5 |

TABLE 5-continued

| | | CSiM |
|---|---|---|
| Example | Composition | Monomer Weight Ratio |
| 33 | D4/VMD4/TEOS/APTMOS/S/DVB//MMA//S/AN | 52.7/5.9/6.5/1.5/3.2/0.07//10//15/5 |
| 34 | D4/VMD4/TEOS/APTMOS/S/DVB//BA//MMA | 60.2/6.7/7.4/1.7/3.7/0.08//7//13 |
| 35 | D4/VMD4/TEOS/APTMOS/S/DVB//S//MMA | 60.2/6.7/7.4/1.7/3.7/0.08//7//13 |
| 36 | D4/VMD4/TEOS/APTMOS/S/DVB//S/DVB | 54.7/3.0/6.8/0.95/4.4/0.09//30//0.3 |

EXAMPLES 37 TO 53

Using the blending procedures described above compositions of this invention are prepared, molded and tested. The formulations used and the results are set forth in Table 6 as follows:

TABLE 6

| POLYCARBONATE-CSiM, POLYCARBONATE-POLYESTER-CSiM, AND POLYPHENYLENE ETHER-CSiM BLENDS | | | | | | | | | | | | | | | | | | |
|---|---|---|---|---|---|---|---|---|---|---|---|---|---|---|---|---|---|---|
| Example | 37 | 38 | 39 | 40 | 41 | 42 | 43 | 44 | 45 | 46 | 47 | 48 | 49 | 50 | 51 | 52 | 53 | 53A* |
| Polycarbonate[A] - wt % | 86 | 90 | 95 | 95 | 95 | 95 | 95 | 95 | 95 | 95 | 50 | 50 | 50 | 50 | 50 | 50 | — | — |
| Polyester[B] - wt % | — | — | — | — | — | — | — | — | — | — | 40 | 40 | 40 | 40 | 40 | 40 | — | — |
| Polyphenylene Ether (0.40IV), wt % | — | — | — | — | — | — | — | — | — | — | — | — | — | — | — | — | 75 | 100 |
| CSiM - wt % (Example Prepared From) | 14 (20) | 10 (21) | 5 (22) | 5 (23) | 5 (24) | 5 (25) | 5 (26) | 5 (27) | 5 (28) | 5 (29) | 10 (30) | 10 (31) | 10 (32) | 10 (33) | 10 (34) | 10 (35) | 25 (36) | — |
| NI ft. lbs./in. @ 23°C. | | | | | | | | | | | | | | | | | | |
| .125" | 11.4 | 12.6 | 14.1 | 14.9 | 14.8 | 14.6 | 16.4 | 14.1 | 14.6 | 12.5 | 15.2 | 16.5 | 15.7 | 16.5 | 15.8 | 14.8 | 7.8 | 0.6 |
| .250" | 4.0 | 9.3 | 10.5 | 11.7 | 11.4 | 11.3 | 11.7 | 10.6 | 11.4 | — | — | — | — | — | — | — | — | — |
| Ni ft. lbs. in. @ −30° C. .125" | — | — | — | — | — | — | — | — | — | 8.9 | — | 12.7 | 11.8 | 6.5 | 10.3 | 12.3 | — | — |
| Charpy NI[C] | | | | | | | | | | | | | | | | | | |
| 125" @ −35° C. | — | 7.4 | — | — | — | — | — | — | — | — | — | — | — | — | — | — | — | — |
| 125" @ −30° C. | — | — | 10.7 | 10.5 | 10.9 | 11.4 | — | 8.7 | — | — | — | — | — | — | — | — | — | — |

[A] poly(bisphenol-A carbonate), Lexan ® 141, General Electric Company
[B] poly(1,4-butylene terephthalate), Valox ® 315, General Electric Company
[C] By Falling Weight Examples 37–53 alone and when compared with Comparative Examples 5B* (Table 1); 11C*, 11E*, and 11F* (Table 2); 16A* (Table 4), and 53 A* demonstrate the improved impact strength at room temperature and at low temperature that CSiM modifiers of the present invention impart to polycarbonate resin, to polycarbonate resin/ polyester resin, and to polyphenylene ether resin blends.

In the foregoing examples, the degree of swelling was determined in the following fashion:

A prepared polyorganosiloxane-based latex was coagulated by adding it to about 4 times its volume of methanol and water (1:1 volume ratio) containing 1 wt percent $MgSO_4$. The precipitated rubber was washed and vacuum-dried at 70° C. overnight. Approximately 1 g of the dry silcone-based rubber was immersed in 100 ml toluene for 20 to 24 hours at ambient temperature and allowed to swell. The excess toluene was separated by decantation. The swelled polymer was vacuum-dried at 60° C. overnight, and the resulting polymer was weighed. The degree of swelling was calculated as: DS=((weight of swelled polymer)−(weight of dry polymer)) divided by (weight of dry polymer).

Graft Efficiency was determined by weighing dry multi-stage polyorganosiloxane-based graft polymer in a weighed thimble which was Soxhlet extracted by methyl ethylketone (MEK) for 20 to 22 hr. After vacuum-drying, the residue of MEK extraction was weighed. The graft efficiency was calculated as: GF (%)=((weight of grafted monomer(s))×100) divided by (weight of total monomer(s) polymerized).

All patents and applications mentioned above are hereby incorporated by reference.

Many variations of the present invention will suggest themselves to those skilled in this art in light of the above, detailed description. For example, instead of polycarbonate and poly(1,4-butylene terephthalate), 10 parts by weight of the graft polymers of Examples 1 and 12 can be used to enhance the impact strength of 90 parts by weight of the following thermoplastic resins: nylon 6; nylon 6,6; polyoxymethylene; poly(ethylene terephthalate); a mixture of 75 parts of poly (2,6-dimethyl-1,4-phenylene ether) with 25 parts of rubber modified high impact polystyrene, and a copolymer of 70 parts of styrene and 30 parts of acrylonitrile. Glass fibers can be used to reinforce the compositions and polybrominated diphenyl ether can be used to make them flame retardant. All such obvious variations are within the full intended scope of the appended claims.

I claim:

1. A multi-stage polyorganosiloxane/polyvinyl-based graft polymer composition comprising:
   (a) as a first stage, a substrate selected from
      (i) a polymeric co-homopolymerized substrate comprised of, in combination, an organosiloxane polymer and at least one vinyl-based polymer;
      (ii) a polymeric co-homopolymerized substrate comprised of, in combination, an organosiloxane polymer, at least one vinyl-based polymer, and units which are derived from a cross-linking agent or agents;
      (iii) a polymeric co-homopolymerized substrate comprised of, in combination, an organosiloxane polymer, at least one vinyl-based polymer, and units which serve as a graft-linking agent or agents;

(iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or (v) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; and (b) at least one subsequent stage or stages graft polymerized in the presence of any previous stages and which is comprised of a vinyl-based polymer or a cross-linked vinyl-based polymer.

2. A composition as defined in claim 1 wherein said organosiloxane/vinyl-based co-homopolymer first stage substrate (a) comprises approximately 5 to 95 weight percent of the total graft polymer composition based upon the weight of said first stage substrate and any subsequent graft stages taken together.

3. A composition as defined in claim 2 wherein said first stage substrate (a) comprises approximately 30 to 90 weight percent of the total graft polymer composition.

4. A composition as defined in claim 1 wherein said first stage substrate (a) is comprised of approximately 3 to 97 weight percent of organosiloxane polymer and correspondingly approximately 97 to 3 weight percent of vinyl-based polymer.

5. A composition as defined in claim 4 wherein said first stage substrate (a) is comprised of approximately 5 to 45 weight percent of vinyl-based polymer.

6. A composition as defined in claim 1 wherein said organosiloxane polymer is comprised primarily of a mixture of units of the formula $$R_nSiO_{(4-n)/2}$$

wherein R is hydrogen or a monovalent hydrocarbon radical of about 1 to 16 carbon atoms and n is 0, 1 or 2.

7. A composition as defined in claim 1 wherein the vinyl-based polymer component of said first stage substrate (a) is comprised primarily of polymerized alkenyl aromatic units, (meth)acrylate units or a mixture thereof.

8. A composition as defined in claim 7 wherein said vinyl-based polymer component of said first stage substrate (a) comprises polystyrene.

9. A composition as defined in claim 7 wherein said vinyl-based polymer component of said first stage substrate (a), is comprised primarily of divinylbenzene units and other alkenyl aromatic units.

10. A composition as defined in claim 9 wherein said vinyl-based copolymer component of said first stage substrate (a) comprises styrene/divinylbenzene copolymer.

11. A composition as defined in claim 1 wherein the vinyl-based polymer in any subsequent stage (b) includes monomers selected from the group consisting of alkenyl aromatic compounds, (meth)acrylate compounds, vinyl cyanide compounds, maleimide compounds, acrylamide compounds or combinations of any of the foregoing.

12. A composition as defined in claim 11 wherein said vinyl-based polymer in any subsequent stage (b) is selected from the group consisting of polystyrene, styrene/acrylonitrile copolymer, styrene/divinylbenzene copolymer, and styrene/acrylonitrile/divinylbenzene terpolymer.

13. A composition as defined in claim 1 wherein said subsequent stages comprise (b)(i) a second stage comprising at least one polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and (b)(ii) a third stage comprising at least one vinyl-based polymer or a cross-linked vinyl-based polymer which is the same as, or different than, said (b)(i) polymer.

14. A composition as defined in claim 13 wherein the ratio of first stage substrate polymer (a) to second stage polymer (b)(i) is 10:90 to 90:10 by weight based upon 100 parts by weight of (a) and (b)(i) combined and the amount of third stage polymer (b)(i) comprises from about 10 to about 90 parts by weight per 100 parts by weight of (a), (b)(i), and (b)(ii) combined.

15. A composition as defined in claim 13 wherein subsequent stage (b)(i) comprises a cross-linked butyl acrylate polymer and subsequent stage (b)(ii) comprises a styrene/acrylonitrile copolymer.

16. A process for producing a multi-stage polyorganosiloxane/polyvinyl-based graft polymer comprising the steps of:

(i) providing a first stage substrate by the concurrent co-homopolymerization of (1) an organosiloxane and one or more vinyl-based monomers;

(2) an organosiloxane, one or more vinyl-based monomers, and units which are derived from a cross-linking agent or agents;

(3) an organosiloxane, one or more vinyl-based monomers, and units which serve as a graft-linking agent or agents;

(4) an organosiloxane, one or more vinyl-based monomers, units which are derived from at least one cross-linking agent or agents and units of the same or different agent or agents which serve as a graft-linking agent or agents; or (5) an organosiloxane, one or more vinyl-based monomers, and a mixture of any of units which are derived from a cross-linking agent or agents, units which serve as a graft-linking agent or agents, or units derived from a cross-linking agent or agents and units from the same or different agent or agents which serve as a graft-linking agent or agents;

(ii) neutralizing the reaction mass of the foregoing polymerization step to a pH of at least about 6.5 to provide a neutralized polyorganosiloxane/polyvinyl-based substrate latex;

(iii) graft polymerizing at least one vinyl-based monomer in a subsequent stage in the presence of said polyorganosiloxane/polyvinyl-based substrate thereby providing said multi-stage polyorganosiloxane/polyvinyl-based graft polymer.

17. A process as defined in claim 16 wherein graft polymerization step (iii) is carried out in two successive stages comprising
   (1) a graft polymerizing at least one vinyl-based monomer; or vinyl-based monomer in admixture with a cross-linker, a graft-linker, or a cross- and graft-linker or a mixture of the foregoing to produce a second stage of polymer or cross-linked polymer on said substrate; and, thereafter,
   (2) graft polymerizing at least one vinyl-based monomer or a monomer and a cross-linker which is the same as or different than that used in step (iii)(1) to produce a third stage of polymer on said second stage.

18. A process as defined in claim 17 wherein the polymer for the second stage is produced by polymerizing butyl acrylate, a cross-linker or optionally a graft-linker, and the polymer for the third stage is produced by polymerizing styrene and acrylonitrile.

19. A process as defined in claim 16 further comprising the step of isolating said multi-stage organosiloxane/vinyl-based graft polymer to provide a polyorganosiloxane/polyvinyl-based modifier for thermoplastic resins.

20. A process as defined in claim 17 further comprising the steps of isolating said multi-stage organosiloxane/vinyl-based graft polymer to provide a polyorganosiloxane/polyvinyl-based modifier for thermoplastic resins.

21. A process as defined in claim 19 further comprising the step of combining a modifying amount of said polyorganosiloxane/polyvinyl-based modifier with a thermoplastic resin.

22. A process as defined in claim 20 further comprising the step of combining a modifying amount of said polyorganosiloxane/polyvinyl-based modifier with a thermoplastic resin.

23. A process as defined in claim 21 wherein said thermoplastic resin comprises a poly(vinylic) resin, a polyester resin, a polyamide resin, a polycarbonate resin, a polyacetal resin, a polyether resin, a poly(etherimide) resin, a poly(sulfone) resin, interpolymers comprising units of any of the foregoing resins and compositions comprising blends of any of them.

24. A process as defined in claim 23 wherein said thermoplastic resin comprises a polycarbonate resin.

25. A process as defined in claim 23 wherein said thermoplastic resin comprises a polyester resin.

26. A process as defined in claim 21 wherein said polyorganosiloxane/polyvinyl-based modifier is used in an amount of about 1 to 60 parts by weight per 100 parts thermoplastic resin.

27. A composition comprising
   (A) A thermoplastic resin,
   and an effective modifying amount of a multi-stage polyorganosiloxane/polyvinyl-based graft polymer composition (B) comprising:
   (a) as a first stage, a substrate selected from
      (i) a polymeric co-homopolymerized substrate comprised of, in combination, an organosiloxane polymer and at least one vinyl-based polymer;
      (ii) a polymeric co-homopolymerized substrate comprised of, in combination, an organosiloxane polymer, at least one vinyl-based polymer, and units which are derived from a cross-linking agent or agents;
      (iii) a polymeric co-homopolymerized substrate comprised of, in combination, an organosiloxane polymer, at least one vinyl-based polymer, and units which serve as a graft-linking agent or agents;
      (iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or
      (v) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; and
   (b) at least one subsequent stage or stages graft polymerized in the presence any previous stages and which is comprised of a vinyl-based polymer or a cross-linked vinyl-based polymer.

28. A composition as defined in claim 27 wherein component (A) comprises from about 1 to about 99 parts by weight and component (B) comprises from about 99 to about 1 part by weight per 100 parts by weight of (A) and (B) together.

29. A composition as defined in claim 28 wherein component (A) comprises from about 99 to about 37 parts by weight and component (B) comprises from about 1 to about 63 parts by weight.

30. A composition as defined in claim 27 wherein said thermoplastic resin (A) comprises a poly(vinylic) resin, a polyester resin, a polyamide resin, a polycarbonate resin, a polyacetal resin, a polyether resin, a poly(etherimide) resin, a poly(sulfone) resin, interpolymers comprising units of any of the foregoing resins and compositions comprising blends of any of them.

31. A composition as defined in claim 30 wherein said thermoplastic resin (A) comprises a polycarbonate resin.

32. A composition as defined in claim 30 wherein said thermoplastic resin (A) comprises a polyester resin.

33. A composition as defined in claim 27 wherein said organosiloxane/vinyl-based polymer first stage substrate (B) (a) comprises approximately 5 to 95 weight percent of the total graft polymer composition based upon the weight of said first stage substrate and any subsequent graft stage or stages taken together.

34. A composition as defined in claim 33 wherein said first stage substrate (B) (a) comprises approximately 30 to 90 weight percent of the total graft polymer composition.

35. A composition as defined in claim 27 wherein said first stage substrate (B) (a) is comprised of approximately 3 to 97 weight percent of organosiloxane polymer and correspondingly about 97 to 3 weight percent of vinyl-based polymer.

36. A composition as defined in claim 35 wherein said first stage substrate (B) (a) is comprised of approximately 5 to 45 weight percent of vinyl-based polymer.

37. A composition as defined in claim 27 wherein said organosiloxane polymer is comprised primarily of a mixture of units of the formula $$R_nSiO_{(4-n)/2}$$

wherein R is hydrogen or a monovalent hydrocarbon radical of about 1 to 16 carbon atoms and n is 0, 1 or 2.

38. A composition as defined in claim 27 wherein said vinyl-based polymer component of said first stage substrate (B) (a) is comprised primarily of polymerized alkenyl aromatic units, (meth)acrylate units or a mixture thereof.

39. A composition as defined in claim 38 wherein said vinyl-based polymer component of said first stage substrate (B)(a) comprises polystyrene.

40. A composition as defined in claim 38 wherein said vinyl-based polymer component of said first stage substrate (B)(a) is comprised primarily of divinylbenzene units and other alkenyl aromatic units.

41. A composition as defined in claim 27 wherein the vinyl-based polymer in any subsequent stage (B) (b) includes monomers selected from the group consisting of alkenyl aromatic compounds, maleimide compounds, acrylamide compounds of a combination of any of the foregoing.

42. A composition as defined in claim 41 wherein said vinyl-based polymer in any subsequent stage (B)(b) is selected from the group consisting of polystyrene, styrene/acrylonitrile copolymer, styrene/divinylbenzene copolymer, styrene/ acrylonitrile/divinylbenzene terpolymer and poly(butyl acrylate).

43. A composition as defined in claim 27 wherein in component (B) said subsequent stages comprise
   (b)(i) a second stage comprising at least one polymer and optionally units derived from a cross-linking agent or agents, units which serve as a graft-linking agent or agents, units derived from a cross-linking agent or agents and units from the same or different agent or agents which serve as a graft-linking agent or agents, or a mixture of any of the foregoing; and
   (b)(ii) a third stage comprising at least one vinyl-based polymer or cross-linked vinyl-based polymer which is the same as, or different than, (b)(i).

44. A composition as defined in claim 43 wherein the ratio of first stage subtrate (B) (a) to second stage polymer (b)(i) is 10:90 to 90:10 by weight based upon 100 parts by weight of (a) and (b)(i) combined and the amount of third stage polymer (b)(ii) comprises from about 10 to about 90 parts by weight per 100 parts by weight of (B)(a), (b)(i), and (b)(ii) combined.

45. A composition as defined in claim 43 wherein subsequent stage (b)(i) comprises a cross-linked butyl acrylate polymer and subsequent stage (b)(ii) comprises a styrene/acrylonitrile copolymer.

46. A composition as defined in claim 27 which also includes
   (C) an effective amount of a flame retardant agent.

47. A composition as defined in claim 27 which also includes
   (D) an effective amount of a reinforcing filler.

48. A composition as defined in claim 27 which also includes
   (C) an effect amount of a flame retardant agent; and
   (D) an effective amount of a reinforcing filler.

49. A composition as defined in claim 43 which also includes
   (C) an effective amount of a flame retardant agent.

50. A composition as defined in claim 43 which also includes
   (D) an effective amount of a reinforcing filler.

51. A composition as defined in claim 43 which also includes
   (C) an effective amount of a flame retardant agent; and
   (D) an effective amount of a reinforcing filler.

52. An article molded from a resin composition as defined in claim 27.

53. An article extruded from a resin composition as defined in claim 27.

54. An article thermoformed from a resin composition as defined in claim 27.

55. An article molded from a resin composition as defined in claim 43.

56. An article extruded from a resin composition as defined in claim 43.

57. An article thermoformed from a resin composition as defined in claim 43.

58. A process as defined in claim 22 wherein said thermoplastic resin comprises a poly(vinylic) resin, a polyester resin, a polyamide resin, a polycarbonate resin, a polyacetal resin, a polyether resin, a poly(etherimide) resin, a poly(sulfone) resin, interpolymers comprising units of any of the foregoing resins and compositions comprising blends of any of them.

59. A process as defined in claim 58 wherein said thermoplastic resin comprises a polycarbonate resin.

60. A process as defined in claim 58 wherein said thermoplastic resin comprises a polyester resin.

61. A process as defined in claim 22 wherein said polyorganosiloxane/polyvinyl-based modifier is used in an amount of about 1 to 60 parts by weight per 100 parts thermoplastic resin.

62. A process as defined in claim 23 wherein said polyester resin comprises a poly(etherester) resin, said poly(etherimide) resin comprises a poly(etherimide ester) resin, and said poly(sulfone) resin comprises a poly(ethersulfone) resin.

63. A composition as defined in claim 30 wherein said polyester resin comprises a poly(etherester) resin, said poly(etherimide) resin comprises a poly(etherimide ester) resin, and said poly(sulfone) resin comprises a poly(ethersulfone) resin.

64. A process as defined in claim 58 wherein said polyester resin comprises a poly(etherester) resin, said poly(etherimide) resin comprises a poly(etherimide ester) resin, and said poly(sulfone) resin comprises a poly(ethersulfone) resin.

* * * * *